(12) United States Patent
Friend

(10) Patent No.: US 10,391,704 B2
(45) Date of Patent: Aug. 27, 2019

(54) METHOD TO MANUFACTURE A RAZOR HANDLE

(71) Applicant: The Gillette Company LLC, Boston, MA (US)

(72) Inventor: Alexander James Hinchliffe Friend, Reading (GB)

(73) Assignee: The Gillette Company LLC, Boston, MA (US)

( * ) Notice: Subject to any disclaimer, the term of this patent is extended or adjusted under 35 U.S.C. 154(b) by 146 days.

(21) Appl. No.: 15/598,370

(22) Filed: May 18, 2017

(65) Prior Publication Data
US 2018/0029310 A1 Feb. 1, 2018

(51) Int. Cl.
| | | |
|---|---|---|
| *B26B 21/52* | (2006.01) | |
| *B29C 64/10* | (2017.01) | |
| *B33Y 10/00* | (2015.01) | |
| *B25G 1/10* | (2006.01) | |
| *B33Y 50/02* | (2015.01) | |
| *B33Y 80/00* | (2015.01) | |
| *B29C 64/386* | (2017.01) | |
| *B29L 31/00* | (2006.01) | |

(52) U.S. Cl.
CPC ............... *B29C 64/10* (2017.08); *B25G 1/10* (2013.01); *B25G 1/102* (2013.01); *B26B 21/521* (2013.01); *B26B 21/522* (2013.01); *B26B 21/527* (2013.01); *B26B 21/528* (2013.01); *B29C 64/386* (2017.08); *B33Y 10/00* (2014.12); *B33Y 50/02* (2014.12); *B33Y 80/00* (2014.12); *B29L 2031/769* (2013.01)

(58) Field of Classification Search
CPC ..................................................... B26B 21/52
See application file for complete search history.

(56) References Cited

U.S. PATENT DOCUMENTS

| | | |
|---|---|---|
| 2,053,258 A | 9/1936 | Axien |
| 2009/0320297 A1 | 12/2009 | Segeren et al. |
| 2013/0291390 A1 | 11/2013 | Gajria et al. |
| 2016/0325445 A1 | 11/2016 | Molinari |
| 2018/0169852 A1* | 6/2018 | Fryer-Biggs ............. B26B 3/00 |

OTHER PUBLICATIONS

European Search Report and opinion in corresponding international application 16181947.9 dated Jan. 25, 2017.

\* cited by examiner

*Primary Examiner* — Benjamin A Schiffman
(74) *Attorney, Agent, or Firm* — Kevin C. Johnson

(57) ABSTRACT

The present invention relates to a method of manufacturing personalized razor handles.

5 Claims, 1 Drawing Sheet

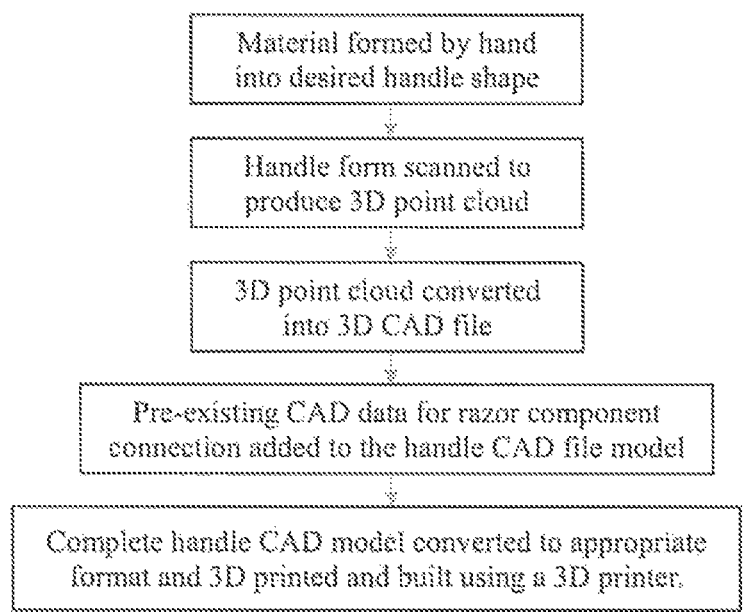

METHOD TO MANUFACTURE A RAZOR HANDLE

FIELD OF THE INVENTION

The present invention relates to a method for manufacturing razor handles particularly for non-industrial scale manufacturing, in order to produce personalized razor handles.

BACKGROUND OF THE INVENTION

In general, many techniques have been used over the years to manufacture razor handles. For example, the handle may be formed by molding of different plastic resins such as polystyrene, polypropylene and phenylene oxide as well as elastomeric materials, colorants, stabilizers and fillers. These resins are typically provided in a pellet form which is melted and molded into the desired form using extrusion and injection molding techniques and processes.

These methods are incorporated into highly efficient manufacturing processes which enable the mass production of the handles. However, such continuous processes are not applicable to provide customized or personalized or unique one off handle designs which are desirable for consumers as a means to express their individuality and/or to provide personalized ergonomic designs.

Hence, there is a need to provide a method of manufacture for small scale or one off razor handle designs which can be readily connected to commercially available razor cartridges without the need for large scale manufacturing facilities.

3D printers are known in the art to enable small scale or prototype printing of goods. Razor handles have also been produced using 3D printing. However, such handles are typically simple handles or reproduction of designs already available in the market. A process to easily produce unique or personalized razor handles without expert knowledge particularly of CAD is not described. Moreover, such handles do not typically enable a satisfactory connection to commercially available razor cartridges and thus do not ensure a consumer desirable shaving experience.

SUMMARY OF THE INVENTION

The present invention relates to a method to manufacture a personalized razor handle, said method comprising the steps of:
 a) Providing a material which is formable by hand
 b) Forming a handle model from said moldable material by hand
 c) Creating a 3D point cloud from said handle model
 d) Creating a 3D CAD file of said 3D point cloud of said handle model
 e) Creating a connection point for a razor cartridge in said 3D CAD file of said handle model
 f) 3D printing said connection point and handle

BRIEF DESCRIPTION OF THE DRAWING

FIG. 1: Schematic overview of the manufacturing process of the invention.

DETAILED DESCRIPTION OF THE INVENTION

A method to manufacture a razor handle, said method comprising the steps of:
 a) Providing a material which is formable by hand
 b) Forming a handle model from said moldable material by hand
 c) Creating a 3D point cloud from said handle model
 d) Creating a 3D CAD file of said 3D point cloud of said handle model
 e) Creating a connection point for a razor cartridge in said 3D CAD file of said handle
 f) 3D printing said connection point and handle Material Formable by Hand Any material which can be molded by the application of pressure and/or heat by a consumer or by the use of handheld tools such as chisels and the like to form a model is suitable for use in the method of the present invention. Suitable materials include modeling clays, paper maché, foams, wood, plastics and waxes. Particularly preferred are modeling clays.

The use of such formable or moldable materials enables the consumer to create an individual or personalized handle form which may be unique. For example, the handle model may comprise at least a portion of a hand print such as the palm of the hand. Such models may have an ergonomic form. The handle may be further personalized by the use of indicia or names.

3D Cloud Point and CAD Files

After forming the model of the handle by hand, the model is scanned using a 3D scanner or digital photography software in order to create a 3D cloud point from said handle model. The 3D cloud point is then utilized to create a 3D CAD file of the model. Any commercially available 3D scanners may be used for the production of the cloud point such as the Matter & Form 3D scanner available from Matter & Form Inc., the MakerBot Digitizer available from MakerBot Industries LLC or the Artec Eva 3D Scanner available from Artec 3D.

The resultant cloud point is optionally scanned for errors. It is then converted to a usable CAD file for optimal manipulation and printing.

In order to enable the handle to be functionally connected to a commercially available razor cartridge, the resultant handle requires a connection point to enable the handle to securely dock onto the cartridge. Such a connection point is created using 3D CAD file manipulation techniques. The resultant 3D CAD file is then optionally also scanned for errors. The connection points will vary depending on which commercial cartridge brand is to be utilized.

The resultant 3D CAD file of the handle model and connection point is then converted into a .stl file in order for it to be 3D printed. Any suitable 3D printer may be used for example; the MakerBot Replicator Series, available from MakerBot Industries LLC, the Objet Eden Series, available from Stratasys Ltd., or the Form1 available from Formlabs Inc. Such printers may use a variety of materials known in the art to print the product including but not limited to plastics including ABS and PLA, UV curable resins, metals, and ceramics.

The resultant razor handle produced using the above method enables a user to readily produce a personalized model razor handle using commonly available materials and in the absence of manufacturing facilities but which is nevertheless functional.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition of the same term in a document incorporated by reference, the meaning of definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method to manufacture a razor handle, said method comprising the steps of:
    a) providing a material which is formable by hand
    b) forming a handle model from said moldable material by hand
    c) creating a 3D point cloud from said handle model
    d) creating a 3D CAD file of said 3D point cloud of said handle model
    e) creating a connection point for a razor cartridge in said 3D CAD file of said handle
    f) 3D printing said connection point and handle.

2. A method according to claim 1, wherein said material which is moldable by hand is selected from modeling clays, paper maché, foams, wood, plastics and waxes.

3. A method according to claim 1, wherein handle model is ergonomic.

4. A method according to claim 1, wherein said handle is in the form of at least a partial hand imprint.

5. A method according to claim 1, wherein after creating said CAD file, said model file is scanned for errors.

* * * * *